United States Patent [19]
Meyer

[11] Patent Number: 5,940,296
[45] Date of Patent: Aug. 17, 1999

[54] METHOD AND SYSTEM FOR INTERACTIVELY DEVELOPING A GRAPHICAL CONTROL-FLOW STRUCTURE AND ASSOCIATED APPLICATION SOFTWARE FOR USE IN A MACHINE VISION SYSTEM

[75] Inventor: Frank Meyer, Milford, Mich.

[73] Assignee: Medar Inc., Farmington Hills, Mich.

[21] Appl. No.: 08/931,227

[22] Filed: Sep. 16, 1997

Related U.S. Application Data

[63] Continuation-in-part of application No. 08/554,188, Nov. 6, 1995, Pat. No. 5,742,504.

[51] Int. Cl.$^6$ ................................................. G05B 19/42
[52] U.S. Cl. ........................... 364/188; 364/191; 364/192; 364/474.22
[58] Field of Search .................................. 364/188, 191, 364/192, 193, 474.22, 474.24, 474.15–17, 474.26, 474.28; 395/158, 161, 551.01, 140, 92, 99, 375; 318/568.13, 199; 382/103–105; 340/937; 348/148; 706/905

[56] References Cited

U.S. PATENT DOCUMENTS

| | | | |
|---|---|---|---|
| 4,462,046 | 7/1984 | Spight | 358/101 |
| 4,679,137 | 7/1987 | Lane et al. | 364/188 |
| 4,759,074 | 7/1988 | Iadipaolo et al. | 382/23 |
| 4,833,624 | 5/1989 | Kuwahara et al. | 364/513 |
| 4,852,047 | 7/1989 | Lavallee et al. | 364/513 |
| 4,914,567 | 4/1990 | Lipkis et al. | 364/188 |
| 5,005,119 | 4/1991 | Rumbaugh et al. | 364/200 |
| 5,185,867 | 2/1993 | Ito | 395/375 |
| 5,218,525 | 6/1993 | Amasaki et al. | 364/140 |
| 5,314,055 | 5/1994 | Gordon | 198/395 |
| 5,327,350 | 7/1994 | Endo | 364/474.21 |
| 5,383,110 | 1/1995 | Fujita et al. | 364/191 |
| 5,392,208 | 2/1995 | Takita et al. | 364/188 |
| 5,446,911 | 8/1995 | Juso et al. | 395/800 |
| 5,453,933 | 9/1995 | Wright et al. | 364/474.23 |
| 5,481,712 | 1/1996 | Silver et al. | 395/700 |
| 5,511,147 | 4/1996 | Abdel-Malek | 395/99 |
| 5,517,663 | 5/1996 | Kahn | 395/800 |
| 5,555,179 | 9/1996 | Koyama et al. | 364/468.01 |
| 5,574,828 | 11/1996 | Hayward et al. | 395/50 |
| 5,576,946 | 11/1996 | Bender et al. | 364/146 |

OTHER PUBLICATIONS

Coordinating Computing, Tools and Techniques for distributed software, Munson et al., McGrow–Hill, Computer ZScience Series, pp. 114–129, Jan. 1984.
Industrial Applications of Microelectronics, IECON'84, vol. 2, pp. 3–7, Miyakawa et al. Oct. 1984.

*Primary Examiner*—Reba I. Elmore
*Assistant Examiner*—Ramesh Patel
*Attorney, Agent, or Firm*—Brooks & Kushman P.C.

[57] ABSTRACT

A method and system are provided for interactively developing a graphical, control-flow structure and associated application software for use in a machine vision system using a computer system without the need for a user to write any code. Preferably, the method and system "marry" the ActiveX control standard and the Grafcet/IEC 1131 standard. The structure includes a control sequence having a plurality of steps or nodes, transitions, and links or flow lines which interconnect the nodes and transitions. Hardware operating parameters are stored which correspond to possible hardware for use in the machine vision system. The hardware operating parameters define a set of standard controls having properties. Commands are received from the user of the computer system to select a first control program corresponding to a desired component of a user interface, desired hardware operating parameters corresponding to desired hardware and second control programs corresponding to desired machine vision algorithms. Graphical representations or icons are selected which correspond to the desired second control programs and are displayed in the structure as nodes and/or inputs/outputs of the nodes. The first control program is linked with the desired hardware operating parameters to the second control programs to form the application software. The step of linking includes the step of setting the property of one standard control to be equal to one property of another standard control to form the application software in response to the commands without the user writing any of the application software.

32 Claims, 6 Drawing Sheets

EXECUTION PROCEEDS ALONG BOTH ARMS IN PARALLEL

METHOD AND SYSTEM FOR INTERACTIVELY DEVELOPING A GRAPHICAL CONTROL-FLOW STRUCTURE AND ASSOCIATED APPLICATION SOFTWARE FOR USE IN A MACHINE VISION SYSTEM

CROSS-REFERENCE TO RELATED APPLICATION

This application is a continuation-in-part application of application Ser. No. 08/554,188, filed Nov. 6, 1995, now U.S. Pat. No. 5,742,504 entitled "Method and System for Quickly Developing Application Software For Use In A Machine Vision System."

TECHNICAL FIELD

This invention relates to methods and systems for interactively developing a graphical control-flow structure and associated application software for use in a machine vision system.

BACKGROUND ART

Traditionally, vision tools are programmed together within a programming environment such as C++, Delphi, or Visual Basic wherein a set of tools can be created, used and configured together. Although some environments are easier to program than others (e.g. Visual Basic is easier than C++), they still require knowledge of that programming environment.

The U.S. Pat. No. 5,481,712 to Silver et al. discloses a method and system for interactively generating a computer program in "C" for machine vision analysis wherein the program only permits the operator (i.e. programmer) to make only syntactically correct modifications to the program. A menu element displays permissible programming modifications for the location of interest. The menu element incorporates in its display of permissible programming modifications statements for machine vision analysis of an object image such as calls to machine vision, sub-routines and functions. The computer program is programmed via a closed or proprietary package via predefined tools and operations.

The U.S. Pat. No. 4,914,567 to Lipkis et al. provides for a design system using visual language. The system uses a visual user presentation of a control system, including structure, specification and operation. The visual element enables a user to interactively design, modify and explore operating characteristics. A Grafcet-based graphic control-flow language for setting and testing state variables is disclosed. Additional features are: application-artificial vision systems; object-oriented applications platform; top-down design; and setting of variable values. The system links Grafcet and MAP technology.

The U.S. Pat. No. 5,005,119 to Rumbaugh et al. provides for user interactive control of computer programs and corresponding versions of input/output data flow. Programs for a CAD task and their respective data set requirements are visually displayed as a flowgraph with which the user interacts to select input data sets and initiate program executions.

The U.S. Pat. No. 5,327,350 to Endo provides for an interactive-type data input function for controlling the operation of a machine tool by creating a machining program based on input data.

The U.S. Pat. No. 5,383,110 to Fujita et al. adds the feature of answering questions displayed on a display screen to generate a numerical control program.

The U.S. Pat. No. 5,157,663 to Kahn provides for an animated user interface for computer program creation, control and execution. The interface enables the user to create programs in an interactive visual manner. Animation is integrated with computer programming to allow a user to visualize programming flow and operation.

The U.S. Pat. No. 4,679,137 to Lane et al. provides for a process control interface system for designer and operator. A dynamic menu element is used during the definition and selection of operating parameters used by a process control program. Each data structure includes value indicia defining the parameters of the data structures.

The U.S. Pat. No. 4,759,074, to Iadipaolo et al. provides for a method for automatically inspecting parts utilizing machine vision and system utilizing same. The system is taught by a series of steps which features are to be inspected. Typical features, as well as tolerances, are defined by the programmer to develop reference data.

The U.S. Pat. No. 5,574,828, to Hayward et al. U.S. Pat. No. 5,511,147 to Abdel-Malek, U.S. Pat. No. 4,833,624 to Kuwahara et al., U.S. Pat. No. 5,453,933 to Wright et al., U.S. Pat. No. 4,462,046 to Spight, U.S. Pat. No. 5,314,055 to Gordon, each provide general teachings of user interactive programming techniques for robotic or CNC machine tool environments.

In the automation world (i.e. for PLC's), there exists open standards such as Grafcet and IEC 1131 to define the syntax for automation control.

SUMMARY OF THE INVENTION

An object of the present invention is to provide a method and system for interactively developing application software for use in a machine vision system wherein the user teaches an imaging programming task without writing any code. Consequently, the user need not be a programmer. Typically, a programmed computer queries the user's intentions and guides the user's choices until the task is completely taught. In the process, the user does not write a single line of code, but rather sets variables that the machine vision tools require interactively. Certain tool's outputs typically will be another tool's input.

Another object of the present invention is to provide a method and system for interactively developing application software for use in a machine vision system wherein the application software may be developed in a hierarchy which allows bottom-up or top-down program development, thereby adapting to the user's thinking. For example, to measure a distance a ruler tool requires two input geometries and, in turn, outputs a distance. An edge tool may define an edge and feature find tools match a model to define a point. Both these can be the inputs to the ruler tool. The user may start top-down, i.e. he thinks measurement first and the system guides him to define the input geometries. Alternatively, the user may think bottom-up and define the geometries first and then decide to do a measurement between them.

Yet another object of the present invention is to provide a method and system for interactively developing application software for use in a machine vision system wherein the method and system allow the easy integration of third party tools (by using standard controls, such as ActiveX controls). Not only can the standard properties of the controls be inputs or outputs to other tools, but also objects such as geometries can be used as inputs and outputs to other tools.

Yet still another object of the present invention is to provide a method and system for interactively developing application software for use in a machine vision system wherein, to represent the flow through the taught task, a modified Grafcet standard is utilized to accept standard controls and objects as part of the steps and transitions. In the Grafcet standard, transitions can access any control's properties or objects to make execution judgments.

In carrying out the above objects and other objects of the present invention, a method is provided for developing a graphical, control-flow structure and associated application software for use in a machine vision system utilizing a computer system. The structure includes a control sequence having at least one node, at least one transition, and at least one link for interconnecting the at least one node and the at least one transition. The method includes the step of storing an application development program, including a first set of control programs representing possible components of a user interface for the machine vision system. The first set of control programs define a first set of standard controls. The method also includes the step of storing a second set of control programs representing possible machine vision algorithms for the machine vision system. The second set of control programs define a second set of standard controls. The method further includes the step of storing hardware operating parameters corresponding to possible hardware for use in the machine vision system. The hardware operating parameters define a third set of standard controls. The method further includes the step of displaying graphical representations of the possible components, the possible hardware and the possible machine vision algorithms. Then, the method includes the step of receiving commands from a user of the computer system to select a first control program corresponding to a desired component of the user interface, desired hardware operating parameters corresponding to desired hardware and a machine vision graphical representation and its associated second control program corresponding to a desired machine vision algorithm. The method also includes the step of displaying the structure. The graphical representation is a node of the structure. The selected second control program is mapped into the structure at the node. The displayed structure also has at least one transition and at least one link for interconnecting the node and the at least one transition. Finally, the method includes the step of linking the first control program with the desired hardware operating parameters to the second control program to form the application software in response to the commands without the user writing any of the application software.

Further in carrying out the above objects and other objects of the present invention, a system is provided for carrying out the method steps.

The benefits accruing to the method and system of the present invention are numerous. For example, the method and system:

1) Interactively generate/"teach" a computer program.
2) The marriage of two standards ActiveX (i.e. controls) and Grafcet and its derivative IEC 1131, i.e. the ActiveX standard and the Grafcet IEC 1131 have been linked together. As a result of this, an ActiveX behavior is controlled via its methods. Its characteristics are controlled via setting its properties. An ActiveX event can control the sequencing in the Grafcet paradigm.
3) The Grafcet/IEC 1131 standard has now been redefined in that a transition can be either True (the default case), an event generated by some ActiveX control or a Boolean expression defined by an internal variable or properties of any ActiveX Component.
4) A step in the Grafcet standard is now either any third party ActiveX control method or a mathematical step that allows the definition of new internal variables.
5) The teach environment allows algorithms to be defined in a hierarchy that allows bottom-up or top-down teach approach.
6) Combine vision with control.
7) Allows the integration of any third party ActiveX controls.

The idea behind interactively generating a computer program is to ensure that the programmer cannot make syntax errors in producing his code. Hence, the environment guides the programmer via menus and appropriate interface structure to produce code that is correct in syntax. The problem being addressed is that computer languages typically are tightly defined and intolerant to syntax errors.

The second idea is that the system operator does not need to be a skilled programmer. Rather, he can be an applications engineer who primarily understands the application and does not need to be a programmer. These days, automation engineers are used to using programming in ladder logic and Grafcet-type languages. Applications knowledgeable engineers tend to be familiar with these environments and the interactive environment being presented in this application is for these engineers.

The method and system of the present application is different from the examples mentioned above in that it takes a standard of Grafcet and modifies it to allow the integration of another standard, namely ActiveX controls which can be linked in.

Hence, a first unique feature of this invention is that any third party tools in machine vision or automation or otherwise that are written as ActiveX controls can be linked into this interactive environment. To date, no interactive environment allows the interaction of third party components and definitely not the configuration of any ActiveX controls.

ActiveX controls are becoming widely accepted and many are being produced by many companies. These are able to be linked together and used without writing code that can produce syntax errors. A control sequence is set up triggered on events, timers and variable settings. This interactive modified Grafcet/IEC 1131 environment reads the properties of the ActiveX controls and allows these to be set or linked to other properties of other controls. The operator may select which method(s) to run on the control and events fired by controls are used to sequence the logic. Hence, the present invention sets how any third party ActiveX control behaves by viewing the current standard interfaces.

The second unique feature of the present invention is the menu structure that allows operators to think top-down or bottom-up in the way they program. Hence, we are defining a methodology analogous to the human operator to define an inspection routine. This is addressing the type of person who needs to use the system. We want the operator to have applications knowledge and do not want to necessitate that he also be a programmer. Take the following example: An operator wishes to measure the distance between two points. He can think metrology first and start with a rule ActiveX control. The interactive environment after interrogating the ruler ActiveX control knows that two geometries are required. The interactive environment then queries all available ActiveX controls and determines which to present to the operator. Hence, the operator can choose between a line, point or other available geometry. The operator can select to define a new geometry or an existing geometry. Alternatively, the operator thinks points first and proceed to define the points. He then thinks metrology and selects the ruler ActiveX control to measure between already defined points. In this example, it was irrelevant whether the operator think geometry or metrology first. Both approaches work and the interactive environment create a program that runs and does not have any syntax errors. The whole programming sequence is done via menus and icons in a drag and drop environment.

The third feature of this invention is that predefined interfaces are supported to exchange data between tools. By default ActiveX controls expose a set of predefined variables such as floats, double string integers, etc. The invention exposes another interface (COMM) which allows the user to expose his own predefined objects, and have these passed between different ActiveX controls. This defined interface allows for the management of different user defined objects between different ActiveX controls.

The fourth characteristic of this interactive Grafcet/ActiveX environment is the mathematical component that allows the manipulation of data between ActiveX controls in a user friendly manner.

Glossary

ActiveX Control.

A name as defined by Microsoft for programmable elements formerly known variously as OLE Controls, OCXS, or OLE Custom Controls. It uses component technologies built on the Component Object Model (COM). Generally, an ActiveX control is an object that, when instantiated, embodies both specific data and the functions that manipulate it. The ActiveX control is an entity that has state, behavior and identity. An object's state consists of its attributes also known as properties and the attributes' current values. An object's behavior consists of the operations (methods) that can be performed on it and the accompanying state changes. An object's identity is what one uses to distinguish it from other objects. Finally, an ActiveX component has events that inform when something has happened. In contrast, COM objects' behavior is defined by the interfaces it supports. A COM object's state is not explicitly specified, but is implied by its interfaces.

COM.

An open architecture for cross-platform development for applications based on object oriented technology as agreed upon by Digital Equipment and Microsoft Corporation. The Component Object Model defines an interface (similar to an abstract base class), Unknown, from which all COM-compatible classes are derived.

Events.

A notification message sent from an object in response to a state change or user action.

Grafcet.

The Grafcet is a graphical programming language—originally developed by AFCET (Association Francais pour la Cybernetique Economique et Technique) in France and has become an international standard. The Grafcet language represents the functions of an automation system as a sequence of steps and transitions—with directed flow lines connecting the two. It was specifically designed for sequential control problems where the steps are sequential or time dependent. Each step in a Grafcet sequence represents a stable situation in an automation process and has one or more actions associated with it—while a transition indicates the possibility of evolution from one step to the next. Boolean events are associated with each transition. Sequences may be linked together by a branch construct which may represent a conditional or a parallel flow of execution. A single Flow Line is used to link steps and transitions together to indicate the flow of execution. Double flow lines are used when two or more steps within a program must be synchronized.

IEC 1131.

A standard set down by the International Electrotechnical Commission that specifies the syntax and semantics of a unified suite of programming languages for programmable controllers. Part of the standard refers to Sequential Function Charts that is Grafcet-like in structure.

Methods.

A procedure that provides access to an object's data and asks an object to behave as defined by the procedure.

Object-oriented Design.

Or object-oriented programming. In traditional procedural languages (such as C, FORTRAN, and COBOL), code and data are separate. In the object-oriented approach, code and data that belong together can be combined into objects. Object-oriented design is further characterized by the use of inheritance (derived classes), polymorphism, encapsulation and virtual functions (C++) in programming.

Open.

Open for our patent refers to existing standards that are non-proprietary and used by many companies. In the patent to Silver, open is that yes other people can use this system but it is a proprietary Cognex only standard, and not an open intercompany standard. Visual basic is an open programming language. Visual C++ is an open programming language.

Properties.

The attribute of an ActiveX control. This attribute has a value that can either be read, written, or both.

Transition.

A Grafcet transition defines the state of a transition and has an associated Boolean state. It indicates the possibility of evolution from one step to the next. Boolean events are associated with each transition.

RPL.

Rapid programming language. Languages like Visual Basic are rapid programming languages because the programmer can quickly set up user interface and insert objects to achieve his goal. Visual C++ is not regarded as a rapid programming language. Delphi and Visual Basic are regarded as rapid programming languages.

Step.

Within the Grafcet/IEC 1131, each step or node in a Grafcet sequence represents a stable situation in an automation process and has one or more actions associated with it. It has been redefined herein to represent an ActiveX or similar standard component.

VisionBlox™

VisionBlox™ is the tool-kit of machine vision components obeying the ActiveX standards. The components include imaging processing, image acquisition, calibration, geometric functions, and motion control.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
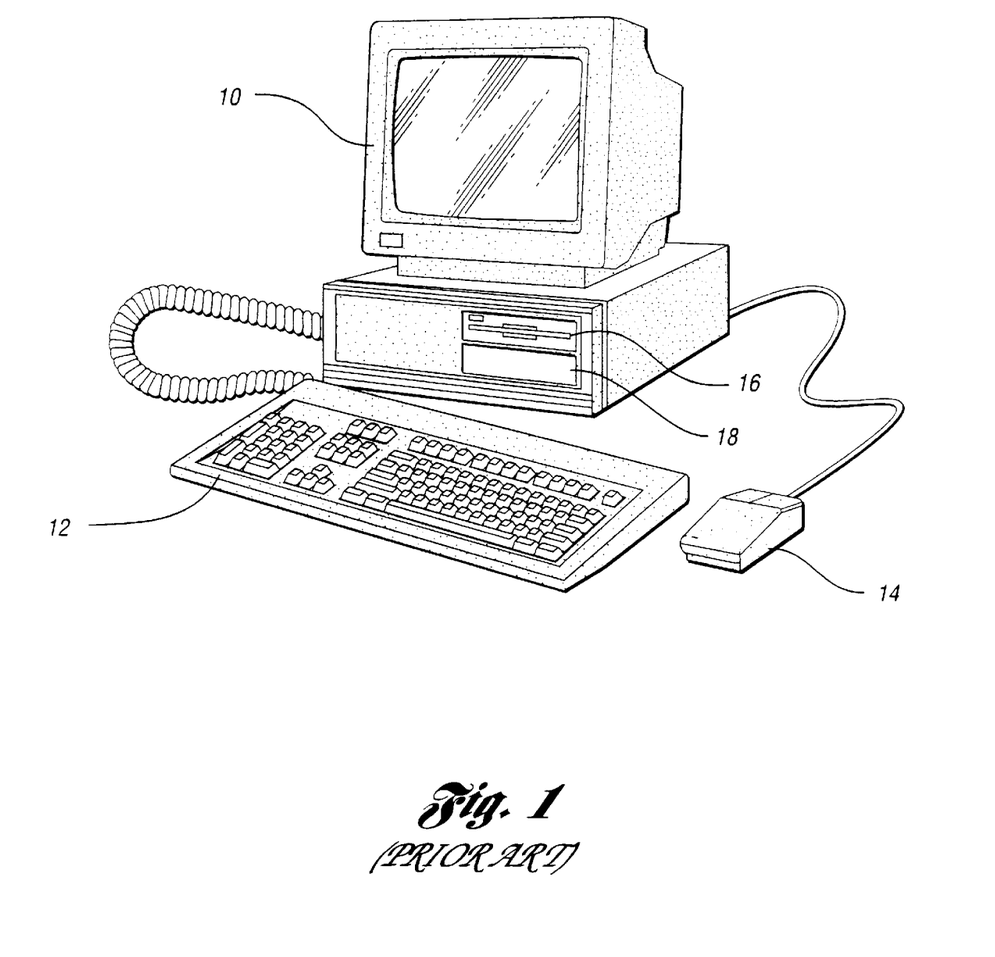
FIG. 1 is a schematic diagram illustrating a preferred hardware configuration on which the method of the present invention can be implemented.

Referring now to the drawings figures, there is illustrated in FIG. 1 a workstation on which the method and system of the present invention can be implemented. The hardware illustrated in FIG. 1 includes a monitor 10 such as a single SVGA display, a keyboard 12, a pointing device such a mouse 14, a magnetic storage device 16, and a chassis 18 including a CPU and random access memory. In a preferred embodiment, the chassis 18 is a Pentium-based IBM compatible PC or other PC having at least 8 megabytes of RAM and at least 12 megabytes of hard disk space.

The hardware configuration also includes the development environment of a high-level, graphic, flowcontrol language such as Grafcet modified by the IEC 1131 standard for pictorially specifying the structure and detailed interaction of a system of concurrent processes.

Figure 2:
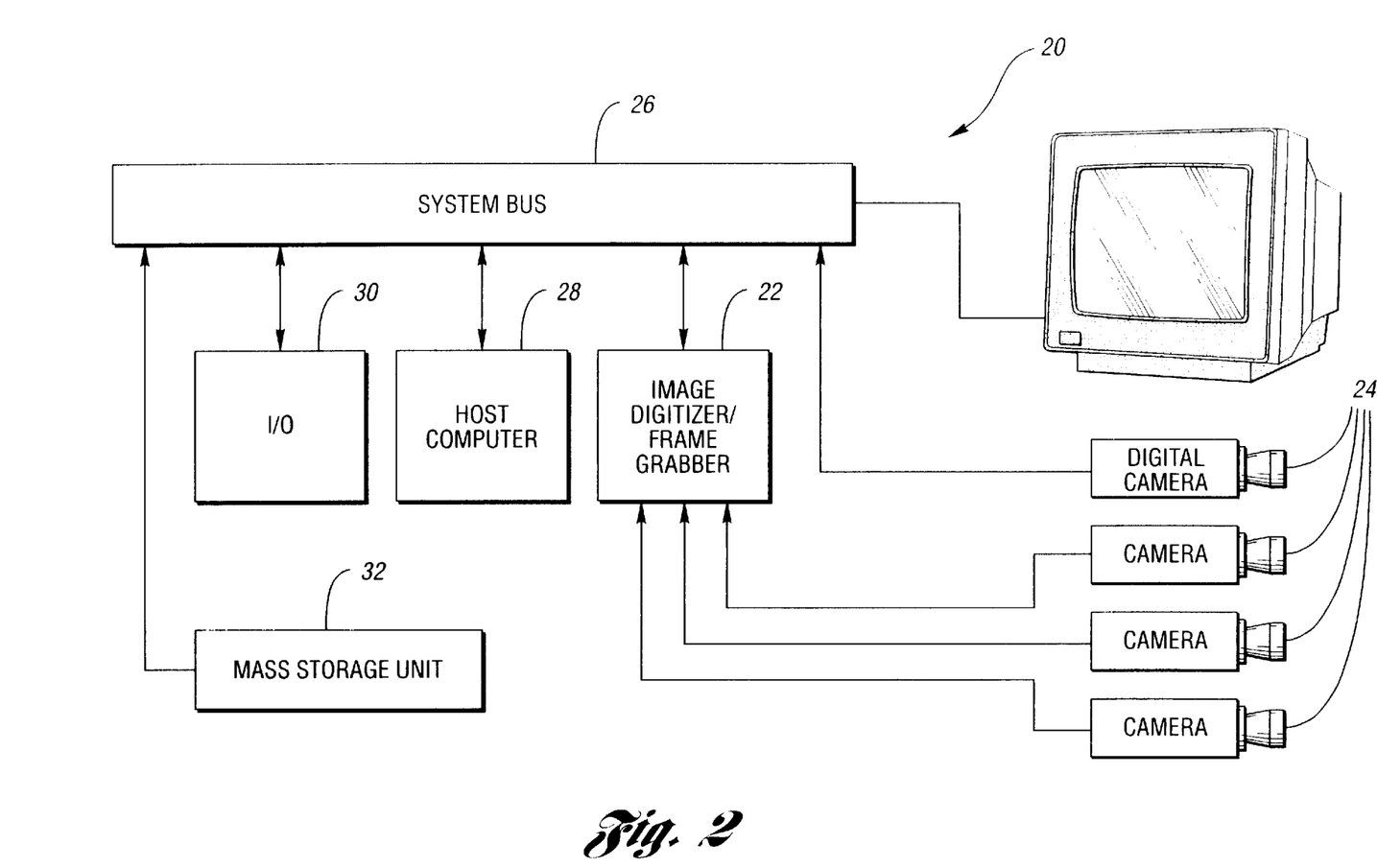
FIG. 2 is a schematic diagram illustrating a machine vision system which can be supported by the method and system of the present invention.

Referring now to FIG. 2, there is illustrated schematically a machine vision system generally indicated at 20 generally of the type which can be supported by the method and system of the present invention. The machine vision system 20 typically includes an image digitizer/frame grabber 22. The image digitizer/frame grabber 22 samples and digitizes the input images from one or more image sources such as cameras 24 and places each input image into a frame buffer having picture elements. Each of the picture elements may consist of an 8-bit number representing the brightness of that spot in the image.

The system 20 also includes a system bus 38 which receives information from the image digitizer/frame grabber 22 and passes the information on to the IBM compatible host computer.

The system 20 also includes input/output circuits 30 to allow the system 20 to communicate with external peripheral devices such as robots, programmable controllers, etc. having one or more stages.

One or more of the cameras 24 may be an image source such as an analog digital or line scan camera such as RS-170, CCIR, NTSC and PAL.

The system bus 26 may be either a PCI an EISA, ISA or VL system bus or any other standard bus.

The I/O circuits 30 may support a three axis stepper board (i.e. supports multiple axis control) or other motion boards.

The image digitizer/frame grabber 22 may be a conventional frame grabber board such as that manufactured by Matrox, Cognex, Data Translation or other frame grabbers. Alternatively, the image digitizer/frame grabber 22 may comprise a vision processor board such as made by Cognex.

The machine vision system 20 may be programmed at a mass storage unit 32 to include custom controls for image processing, image analysis, third party machine vision products, calibration, and interactive CAD/geometry as described in greater detail hereinbelow. Examples of image processing may include linear and nonlinear enhancement, morphology, color and image arithmetic. Also, image analysis may include search, edge, caliper, blob, template, color, 2-D and 3-D measurements.

Third party products may include digital I/O, various camera formats, motion, databases, SPC and others.

Calibration may include non-linear, 2-D, 3-D and color calibration.

Also, interactive CAD/geometry custom control may be provided for both 2-D and 3-D space.

It is to be understood that other similar programming environments can be utilized by the method and system of the present invention.

Figure 3:
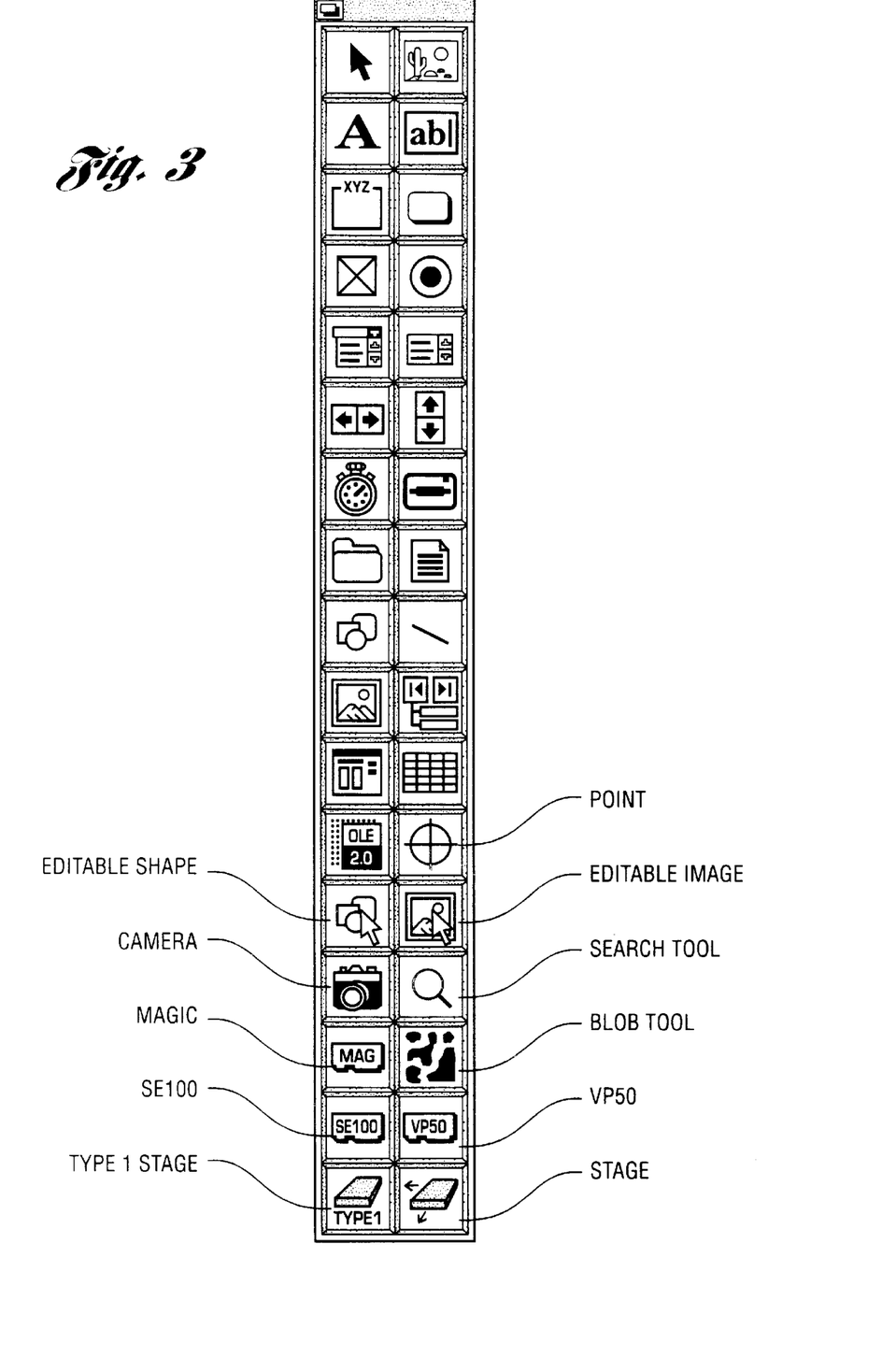
FIG. 3 is a portion of a programming environment after standard controls of the present invention have been added.

Referring now to FIG. 3, there are illustrated icons of a toolbox which appear after various custom controls, which will be described in greater detail hereinbelow, are added thereto.

Each custom control is generally described as follows:

An editable shape custom control allows a user to define an image processing region by interactively editing a rectangular ellipsoidal or toroidal (donut) shape.

An editable image custom control works like the visual basic picture box control with enhancements that give the user added image viewing and processing options.

A camera custom control allows a user to capture and store live images from a video camera.

A search tool custom control looks for a specific feature in an image that matches a model that a user trained it to recognize; reports the characteristic of the feature found.

A Magic custom control allow the camera control to capture images when the user has a Magic vision board installed. (This tool is invisible at run time.)

A blob tool custom control finds groups of connected pixels or "blobs" in an image; reports on the characteristics of each blob it found.

An SE 100 custom control allows the camera control to capture images when the user has an SE 100 vision board installed. (This tool is invisible at run time.)

A VP 50 custom control allows the camera control to capture images—and optionally speeds up images searches—when the user has a VP vision board installed. (This tool is invisible at run time.)

A Type I stage custom control allows the stage control to work with a specific manufacturer's stage known as "Type I". (This tool is invisible at run time.)

A Stage custom control allows a user to control a multi-axis stage through a graphical user interface. The developer can include stage control properties and methods in higher level code.

While not shown, a tool board custom control allows a user to navigate through windows and menus in the application by simply clicking buttons on a tool bar.

Also while not shown, a Type II stage custom control allows the stage control to work with a specific manufacturer's stage known as "Type II". (This tool is also invisible at run time.)

Finally, while also not shown, a Type III stage custom control allows the stage control to work with a specific manufacturer's stage known as "Type III". (This tool is furthermore invisible at run time.)

Figure 4:
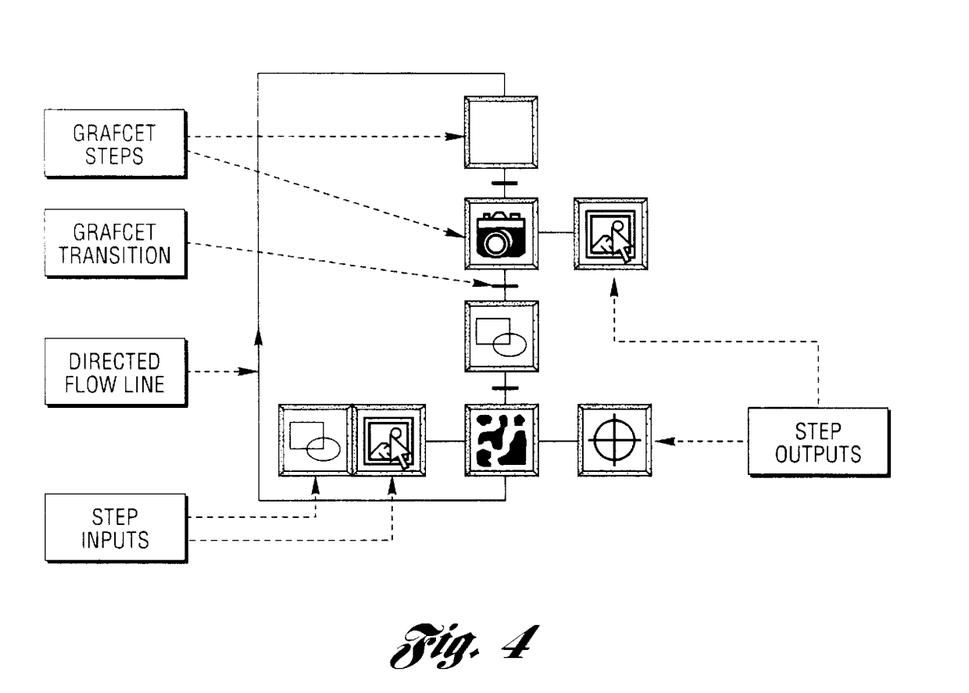
FIG. 4 is schematic view of a typical Grafcet sequence constructed in accordance with the present invention.

In general, it is possible to interactively and easily build machine vision applications or programs using the ActiveX custom controls illustrated in FIG. 4 in the Grafcet/EIC 1131 programming system. In general, one creates the user interface or a vision application by placing the custom controls on a form. Next, one sets the properties for both the Visual Basic standard controls and the custom controls. One need not write code to link together the different parts of the application to obtain the application program since this is done automatically.

A detailed description of many of the various machine vision controls represented by the icons of FIG. 3 can be found in the above-noted patent application.

Two standards are being married together by the present invention to produce an open programmable/reconfigurable/teachable system that does not require the use of a software programming environment. These standards are Grafcet and its derivative IEC 1131 and the ActiveX standard. Optionally via the addition of some predefined COM interfaces, the exchange of data between ActiveX objects is enhanced.

Hence, the advantages of marrying these two standards allows any ActiveX components to be inserted within an environment that is familiar in the automation (i.e. PLC) context. Secondly, by interrogating the properties, methods and events of these ActiveX components operation control can be tailored by the user without doing any programming. Properties, i.e. data, can be exchanged between controls. Mathematical operation can be performed on this data. By selecting which method to call in a control, its operation is controlled. Finally, events control the flow of the logic. The Grafcet/IEC 1131 standard allows conditional and parallel control.

This interactive Grafcet/ActiveX environment is itself an ActiveX component and so can be used as a component within another interactive Grafcet/ActiveX environment.

The user configures the method and system of the present invention either via a drag and drop environment or via a menu system. The menu system is designed to allow the operator to define a sequence either bottom-up or top-down. This is achieved as the user, who need not be a programmer, can "teach" a task. The system queries his intentions, and guides the user's choices until the task is taught. In the process, the user does not write a single line of code and has available to him not only all the tools, vision or otherwise, but can set the variables that the tools require interactively. Certain tool's outputs will be another tool's input.

For example, to measure a distance a ruler tool requires two input geometries and, in turn, outputs a distance. Two other tools, e.g. an edge tool defines an edge and feature find tools match a model to define a point. Both these can be the inputs to the ruler tool.

The user may start top-down, i.e. he thinks measurement first and the system guides him to define the input's geometries. Alternatively, the user may think bottom-up and define the geometries first and then decide to do a measurement between them.

Features, Components and Modules
Grafcet Control

The Grafcet/IEC 1131 standard of the present invention includes transitions and steps.

A transition in the Grafcet/IEC 1131 standard is either:
True (the default case);
An event generated by some ActiveX Control, e.g. an IO ActiveX trigger control; or
A Boolean expression defined by internal variable or properties of any Control.

A Step in the Grafcet standard is either:

Any 3rd party ActiveX control; or
A mathematical step that allows the definition of new internal variables.

Clicking with the left button of the mouse 14 on a control gives the default control interface.

Clicking with the right button of the mouse 14 on the control allows the user to select which method to run and which properties need to be set.

The Grafcet control is an ActiveX custom control that allows vision applications to be programmed in the form of a Grafcet sequence or structure. Programming takes place through a graphical user interface. Existing ActiveX controls are integrated into the Grafcet sequence.

Figure 5:
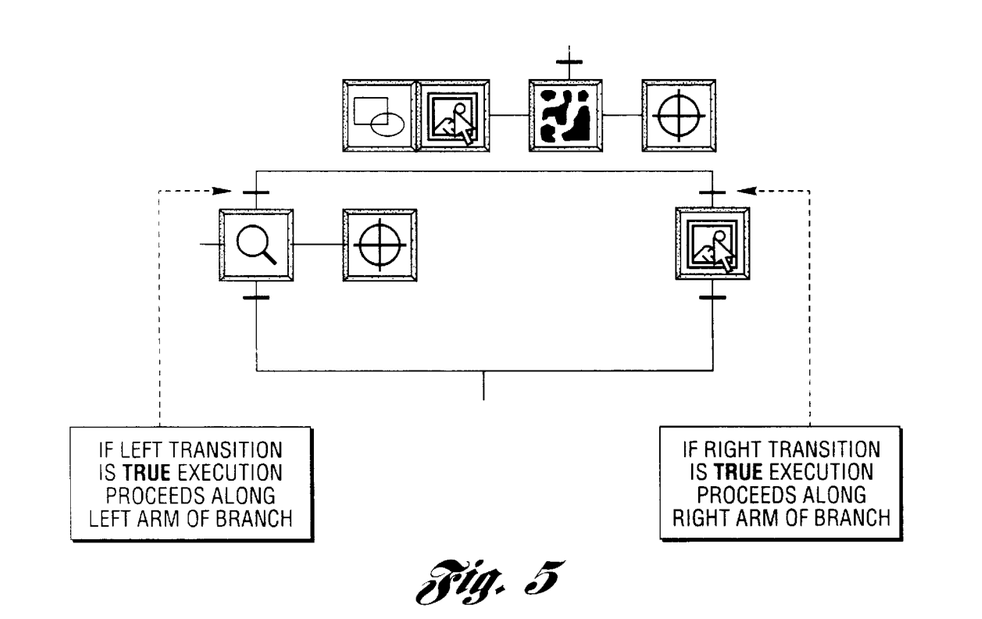
FIG. 5 is a schematic view of a typical Grafcet sequence showing two alternative paths of execution.
Figure 6:
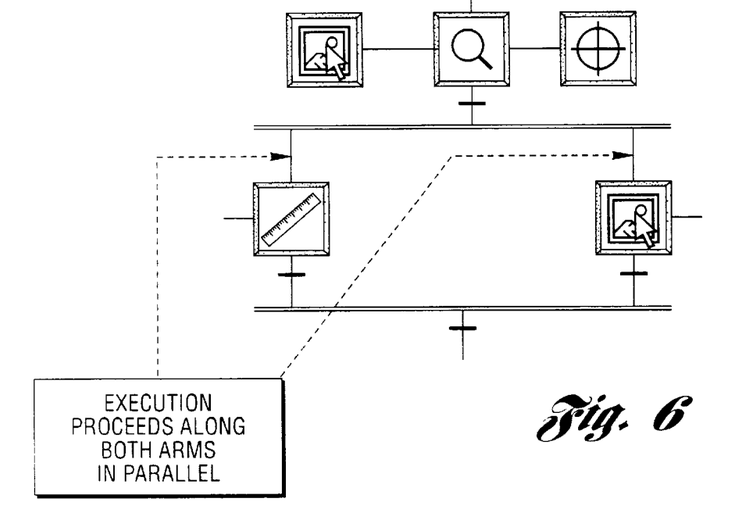
FIG. 6 is a schematic view of a section of a Grafcet sequence showing a parallel branch.

In one method of creating a Grafcet sequence, the user selects tools from a toolbar displayed on the Grafcet interface (such as illustrated in FIG. 3) and drags and drops the tool onto a Sequence display area (a 2 dimensional grid). The steps are shown graphically with icons (representing the tool) which are displayed on the grid. Transitions and flow lines are automatically inserted to maintain a flow chart that obeys the rules of the Grafcet programming language (see FIG. 4).

Where inputs are required for some tools (steps)—the user is prompted for these through a message (displayed in a message panel) and the position for insertion of the input is highlighted. The user selects inputs in the same way as tools are selected—by dragging and dropping onto the sequence. Outputs from steps will be shown automatically. A Grafcet sequence may be inserted as a step in another sequence—allowing for sequence reuse and multi-level sequence definition. The user may also insert a "parallel" or "conditional" branch item into the sequence (FIGS. 5 and 6).

Within a Grafcet Control, Grafcet sequences may be constructed, edited and executed. A pop-up menu is available to access Grafcet Control member functions. To display a pop-up menu click the right button of the mouse 14 when the cursor is within the Grafcet Control Environment (NOTE: if the right mouse button is clicked over a Vision control—then the pop-up for that control will appear instead of the Grafcet control pop-up).

Math's and Event Steps

Figure 7:
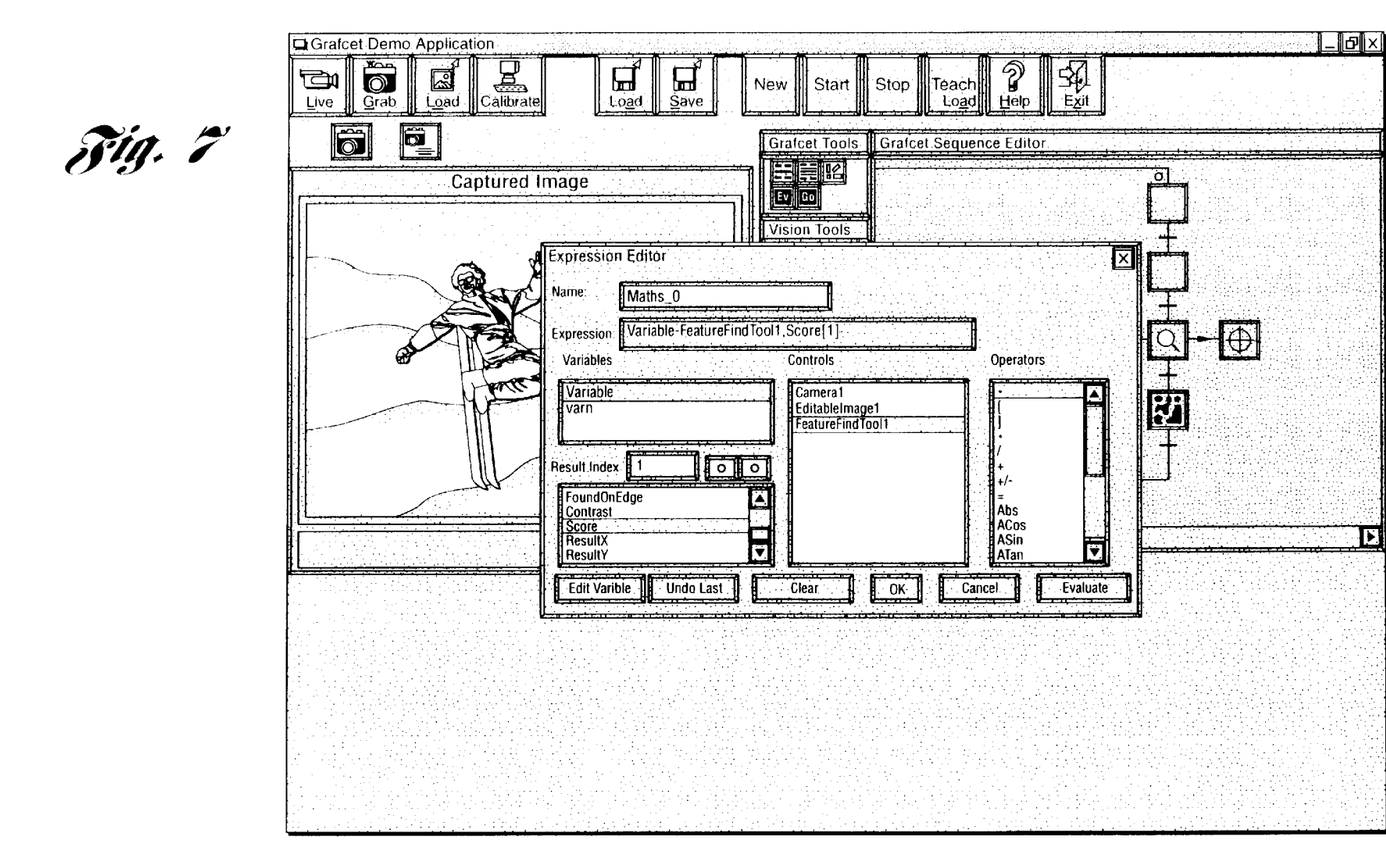
FIG. 7 is a screen display illustrating math's control.
Figure 8:
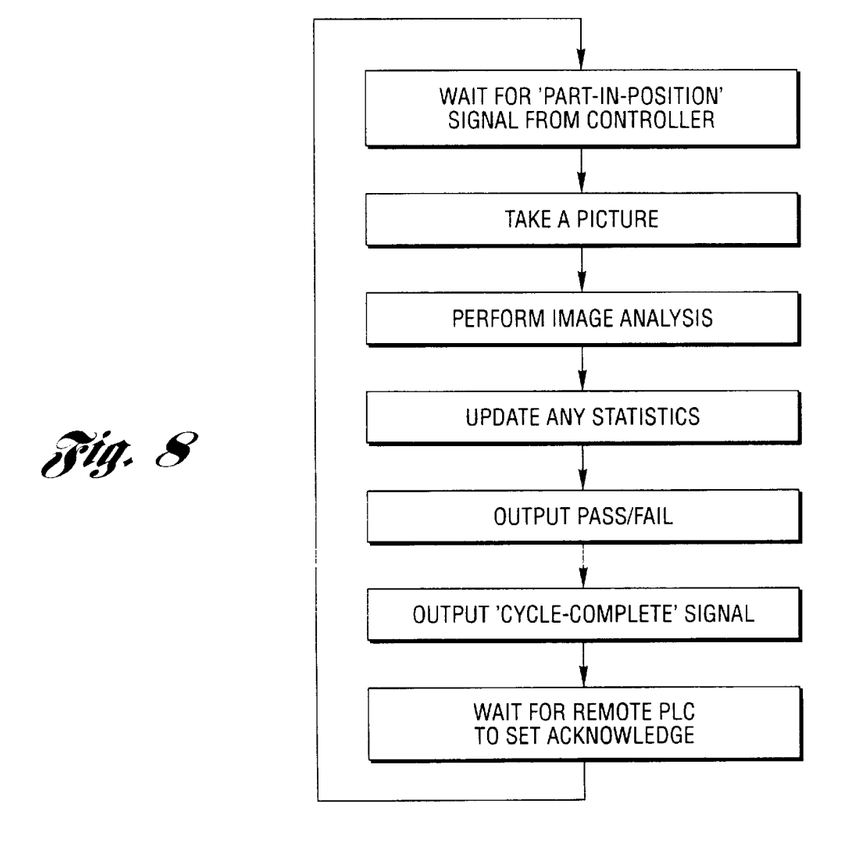
FIG. 8 is a block diagram flow chart illustrating a typical operation sequence in a normal running mode of the vision system which is waiting for a "part present" signal.

The math's step allows the definition of variables and expressions that set the values of these variables. These variables are either numeric or Boolean and can be set to some mathematical function of other variables or properties of Activex controls or some combination of these. (See FIG. 7).

An event step allows an event to be fired into Visual Basic. Thus some Visual Basic can get control during a sequence to perform some predefined functions.

Hierarchical Menu Module As Related To Machine Vision

System Overview

The Interactive GrafcetActiveX environment System of the present invention uses image analysis techniques to perform image analysis and metrology functions, i.e. calibrated measurement. Features such as lines, circles and points etc. can be found and measured. Complex shapes can be identified and verified.

Complete complex applications can be configured literally in minutes, and controlled remotely—using either a digital or a serial link.

The features of the system include:
Ease of Use
Calibrated Measurement Using Real World Units
Extensive Set of Inspection Commands Efficient Use of Memory Simple Digital and Serial Interfacing There are two phases in the operation of the system of the present invention:

Teach Phase: Here the user, using the computer keyboard and monitor, configures the system for his application e.g. part identification or measurement.

Execution Phase: Once configured, the teach system can run completely automatically and can be controlled via an RS232 serial link or it's digital inputs.

In the first phase the user "teaches" the system do a particular application. Using the computer keyboard 12 and monitor 10, the user "configures" the system for a particular application e.g. part identification, measurement etc. Use of the system is made easy by the menu-driven user interface which provides the user with all the commands in a structured and hierarchical manner. Help is available at all points in the program.

The system stores the particular sequence of commands that make the application into an application file. More than one application can be loaded at any one time.

In the second phase, applications can be executed at the press of a button on the keyboard, a remote input, or triggered through the RS232 or other communications line. Automatic system diagnostics provide details of the performance of the application to the user, showing the nature and type of any problems.

All measurements are made in real world coordinates (m, mm, microns, in., thou., etc.).

Many commands are available to include metrology (measurement) functions and image analysis functions. Examples of metrology functions include the measurement of distances, angles, diameters, perimeter, areas, straightness, roundness and shape. Examples of vision functions include gray level edge finding (capable of finding subtle grey level edges), projection, edge sniffing and feature correlation.

System functions can be divided into 3 main categories:

Image Analysis Functions: These functions determine features of an image

System Calibration: These functions allow the system to measure and work in a user defined co-ordinate frame System I/O: These functions allow the system to respond to digital inputs, set digital outputs, communicate through a serial line, print information and save and retrieve information from files.

Image Analysis Functions

The image analysis functions can be sorted into six main categories:

Part locate

Part locate identifies a point and orientation on the image. All search regions, e.g. lines, windows and ellipses that are defined after a part has been located are defined relative to this new part frame Geometry definition These functions concern the definition of the entities that the system uses during part inspection. Lines, ellipses, points and profiles can be defined using these functions.

Metrology

These functions concern the measurement of various quantities between entities defined within the system. Distances, areas, perimeters and angles can be measured. Some quantities can be measured between entities of differing types, e.g. distance from a point to a line. Geometric errors can also be measured. These include the straightness of a line and roundness of a circle.

Morphology Measurement

These functions concern the measurement of surface details, such as cracks, in the image.

Feature Correlation

This function finds a pre-taught feature (model), to pixel accuracy within a grabbed image. The system calculates a "score" that shows the level of similarity between the model and the feature in the current image. The score is defined as a percentage, with 100% being a perfect match.

Morphology enhancement

These functions concern the enhancement of surface details, such as cracks, within the image.

Color Image Processing

Calibration

The purpose of system recalibration is to tell the vision system the units it is working in, i.e. mm, inches etc. Calibration defines the attitude of the camera 24 relative to the field of view. Camera calibration is accomplished by viewing a object of known shape and size, usually a square or round plate. Calibration files are saved with the job file thus allowing different jobs to have different calibration data.

System calibration can be implemented using several methods. The first method/phase has been implemented using several methods. The full methods include:

Initial System Camera Calibration: This occurs whenever the camera 24 is moved, or every 6 months on system maintenance. At calibration time an object of known size is placed in the field of view of each camera 24, its size and location being defined and identified by the system.

Monitoring Camera Movement and Automatic System Recalibration: This is the process whereby the system monitors camera movement, and compensates for such movement. The amount of movement observed is calculated, the calibration matrices adjusted and, if excessive, a warning is raised.

Continuous Automatic System Recalibration: In certain instances system calibration can be accomplished completely automatically. The reference object(s) is/are continuously in, or placed in, the field of view. The system, therefore, calibrates itself and returns information on camera movement. If the camera movement is so excessive that the reference object cannot be seen then a warning is raised. The system continues to operate using the last default calibration.

Menus

This set of menus allows different geometric entities (points, lines, circles, ellipses and profiles) to be defined and selected. Such entities can either be defined using analysis of the video source or can be constructed using existing geometric entities.

Geometry Menu

Point Define Menu

Point on Edge (Window Scan)

Point Define via Feature Location

Center of an Ellipse

Line+Line Intersect

Point on a Profile

Inflection Point

Deflection Point

Line Define Menu

Define by Scanning for Edge
Define by Hand
Define Via Two Points
Profile Primary Vector
Circle Define Menu
Define by Scanning for an Edge
Manual
Profile Define Menu
Metrology Menus The metrology menus allow the user to perform measurements and implement tests based on the measurement results. The measurements and test results can be saved. Statistical Process Control (SPC) may be performed on the measured results. Metrology functions select geometric entries independent of where they are defined. When selecting an entity all geometry's are displayed, from which to select the required entity.

Linear Dimensions
    Distance Line to Line
    Distance Line to Point
    Distance Point to Point Menu
        Caliper: Single Pair
        Caliper: Multiple Pairs
        Actual Distance
        Component Distance
    Circle/Ellipse Radius
    Angular Dimensions
    Angle Line to Line
    Angle Line
    Area Measurement
    Morphology Measurement
    Intensity Evaluation
    Connectivity Evaluation
    Geometric Errors Menu
    Parallelism
    Squareness
    Form Error Straightness
    Form Error Roundness Data Interface Several optional interfaces are suggested. These interface are NOT compulsory as the interactive Grafcet/ActiveX environment can work without them. However, if any of these interface are present this extends the functionality to the Grafcet/ActiveX environment.

These interface provides a set of defined methods and attributes obeying the COM standard.

Display Methods
(iDisplay)

| | |
|---|---|
| Draw | Draws the tool result graphics |
| ShowDisplayGraphicssplay | |
| HideDisplayGraphics | Hide result graphics |
| EnableAutoRefresh | Enables the tool to refresh the result display upon use |
| DisableAutoRefresh | Disables the tool from refreshing the result display upon use |
| IsAutoRefreshEnabled | Returns if the tool's auto refresh is enabled or disabled |

Information Methods
(iInformation)

| | |
|---|---|
| GetMemorySize | Returns the current quantity of heap, in bytes, which the tool is using |
| SetMaximumTime | Sets the maximum time allows for the use function to execute |
| GetMinimumTime | Returns the minimum time required for the used function to execute |
| TimeTaken | Returns the time taken by the Use function on the last use |
| GetMaximumTime | Returns the current setting for Use maximum time allowed for the function to execute |

Date Access Methods
(iData)

| | |
|---|---|
| GetInputType | Returns information regarding an input |
| GetOutput Type | Returns information regarding an output |
| GetNumberOfInputs | Returns the number of inputs |
| GetNumberOfOutputs | Returns the number of outputs |
| GetOutput | Returns a given output |
| SetInput | Set a given input |

Tool Methods
(iTool)

| | |
|---|---|
| AutoTrain | Automatic Training method for the tool |
| Train | Initiate training of the tool |
| AddSample | Add Sample to current training set for the tool |
| PrepareToUse | Prepares the tool for first use |
| Use | Uses the tool with the current trained information |
| GetLastError | Returns the last error generated by the tool |
| Save | Save tool configuration and training information to file |
| Load | Load tool configuration and training information to file |
| Serialize | Serializes the tool configuration to file |

While the best mode for carrying out the invention has been described in detail, those familiar with the art to which this invention relates will recognize various alternative designs and embodiments for practicing the invention as defined by the following claims.

What is claimed is:

1. A method for interactively developing a graphical, control-flow structure and associated application software for use in a machine vision system utilizing a computer system, the structure including a control sequence having at least one node, and at least one transition, and at least one link for interconnecting the at least one node and the at least one transition, the method comprising the steps of:

storing an application development program, including a first set of control programs representing possible components of a user interface for the machine vision system, the first set of control programs defining a first set of standard controls;

storing a second set of control programs representing possible machine vision algorithms for the machine vision system, the second set of control programs defining a second set of standard controls;

storing hardware operating parameters corresponding to possible hardware for use in the machine vision system, the hardware operating parameters defining a third set of standard controls;

displaying graphical representations of the possible components, the possible hardware and the possible machine vision algorithms;

receiving commands from a user of the computer system to select a first control program corresponding to a desired component of the user interface, desired hardware operating parameters corresponding to desired hardware and a machine vision graphical representation and its associated second control program corresponding to a desired machine vision algorithm;

displaying the structure wherein the machine vision graphical representation is a node of the structure, the selected second control program being mapped into the structure at the node, the displayed structure also having at least one transition and at least one link for interconnecting the node and the at least one transition; and linking the first control program with the desired hardware operating parameters to the second control programs to form the application software in response to the commands without the user writing any of the application software.

2. The method as claimed in claim 1 wherein the standard controls include properties and wherein the step of linking includes the step of setting the properties of the standard controls.

3. The method as claimed in claim 2 wherein the step of setting includes the step of setting one property of one standard control to be equal to one property of another standard control.

4. The method as claimed in claim 1 wherein the structure has a hierarchy with a top and a bottom and wherein the hierarchy allows bottom-up or top-down development.

5. The method as claimed in claim 1 further comprising the steps of:

storing a third set of control programs representing possible software products for use in the machine vision system;

displaying machine vision graphical representations of the possible software products; and displaying the graphical representation of a selected software product in the structure as another node or an input/output to the node of the structure, wherein the step of linking links a third control program corresponding to a desired software product with the first and second control programs and the desired hardware operating parameters in response to the commands to form the application software.

6. The method as claimed in claim 1 wherein the desired hardware operating parameters correspond to a desired image source of the machine vision system.

7. The method as claimed in claim 6 wherein the desired image source is a video camera.

8. The method as claimed in claim 6 wherein the desired operating parameters further correspond to a desired vision processor board of the machine vision system.

9. The method as claimed in claim 6 wherein the desired hardware operating parameters further correspond to a desired frame grabber board of the machine vision system.

10. The method as claimed in claim 6 wherein the desired hardware operating parameters further correspond to a desired motion board of the machine vision system.

11. The method as claimed in claim 6 wherein the desired hardware operating parameters further correspond to a desired bus of the machine vision system.

12. The method as claimed in claim 6 wherein the desired machine vision algorithm is an image processing algorithm.

13. The method as claimed in claim 6 wherein the desired machine vision algorithm is an image-analysis algorithm.

14. The method as claimed in claim 6 wherein the desired machine vision algorithm is a calibration space algorithm.

15. The method as claimed in claim 6 wherein the desired machine vision algorithm is an interactive CAD/geometry algorithm.

16. The method as claimed in claim 6 wherein the computer system includes a personal computer.

17. A computer system for interactively developing a graphical, control-flow structure and associated application software for use in a machine vision system, the structure including a control sequence having at least one node, and at least one transition, and at least one link for interconnecting the at least one node and the at least one transition, the computer system comprising:

means for storing an application development program, including a first set of control programs representing possible components of a user interface for the machine vision system, the first set of control programs defining a first set of standard controls;

means for storing a second set of control programs representing possible machine vision algorithms for the machine vision system, the second set of control programs defining a second set of standard controls;

means for storing hardware operating parameters corresponding to possible hardware for use in the machine vision system, the hardware operating parameters defining a third set of custom controls;

a display for displaying graphical representations of the possible components, the possible hardware and the possible machine vision algorithms;

means for receiving commands from a user of the computer system to select a first control program corresponding to a desired component of the user interface, desired hardware operating parameters corresponding to desired hardware and a machine vision graphical representation and its associated second control program corresponding to a desired machine vision algorithm, the display also displaying the structure wherein the machine vision graphical representation is a node of the structure, the selected second control program being mapped into the structure at the node, the displayed structure also having at least one transition and at least one link for interconnecting the node and the at least one transition; and means for linking the first control program with the desired hardware operating parameters to the second control program to form the application software in response to the commands without the user writing any of the application software.

18. The computer system as claimed in claim 17 wherein the standard controls include properties and wherein the means for linking includes means for setting the properties of the standard controls.

19. The computer system as claimed in claim 18 wherein the means for setting sets one property of one standard control to be equal to one property of another standard control.

20. The computer system as claimed in claim 17 wherein the structure has a hierarchy with a top and a bottom and wherein the hierarchy allows bottom-up or top-down development.

21. The computer system as claimed in claim 17 further comprising:

means for storing a third set of control programs representing possible software products for use in the machine vision system, the display displaying graphical representations of the possible software products and a graphical representation of a selected software product in the structure as another node or an input/output to the node of the structure, wherein the step of linking links a third control program corresponding to a desired software product with the first and second control programs and the desired hardware operating parameters in response to the commands to form the application software.

22. The computer system as claimed in claim 17 wherein the desired hardware operating parameters correspond to a desired image source of the machine vision system.

23. The computer system as claimed in claim 22 wherein the desired image source is a video camera.

24. The computer system as claimed in claim 22 wherein the desired operating parameters further correspond to a desired vision processor board of the machine vision system.

25. The computer system as claimed in claim 22 wherein the desired hardware operating parameters further correspond to a desired frame grabber board of the machine vision system.

26. The computer system as claimed in claim 22 wherein the desired hardware operating parameters further correspond to a desired motion board of the machine vision system.

27. The computer system as claimed in claim 22 wherein the desired hardware operating parameters further correspond to a desired bus of the machine vision system.

28. The computer system as claimed in claim 22 wherein the desired machine vision algorithm is an image processing algorithm.

29. The computer system as claimed in claim 22 wherein the desired machine vision algorithm is an image-analysis algorithm.

30. The computer system as claimed in claim 22 wherein the desired machine vision algorithm is a calibration space algorithm.

31. The computer system as claimed in claim 22 wherein the desired machine vision algorithm is an interactive CAD/geometry algorithm.

32. The computer system as claimed in claim 22 wherein the computer system includes a personal computer.

\* \* \* \* \*